US009143411B2

(12) United States Patent
Ni et al.

(10) Patent No.: US 9,143,411 B2
(45) Date of Patent: Sep. 22, 2015

(54) METHOD AND SYSTEM FOR INTERCEPTING OVER-THE-TOP COMMUNICATIONS

(71) Applicant: Verizon Patent and Licensing Inc., Basking Ridge, NJ (US)

(72) Inventors: James J. Ni, Westford, MA (US); Elliot G. Eichen, Arlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 109 days.

(21) Appl. No.: 13/848,264

(22) Filed: Mar. 21, 2013

(65) Prior Publication Data

US 2014/0286177 A1    Sep. 25, 2014

(51) Int. Cl.
*H04L 12/26* (2006.01)
*H04L 29/06* (2006.01)

(52) U.S. Cl.
CPC ............ *H04L 43/026* (2013.01); *H04L 43/028* (2013.01); *H04L 63/306* (2013.01)

(58) Field of Classification Search
None
See application file for complete search history.

(56) References Cited

U.S. PATENT DOCUMENTS

| 7,310,331 | B2* | 12/2007 | Sjoblom | 370/353 |
| 7,620,389 | B2* | 11/2009 | Kallio et al. | 455/414.1 |
| 7,706,291 | B2* | 4/2010 | Luft et al. | 370/246 |
| 7,969,968 | B2* | 6/2011 | De Luca et al. | 370/352 |
| 8,599,747 | B1* | 12/2013 | Saleem et al. | 370/321 |
| 2002/0064164 | A1* | 5/2002 | Barany et al. | 370/401 |
| 2004/0202295 | A1* | 10/2004 | Shen et al. | 379/112.01 |
| 2005/0094651 | A1* | 5/2005 | Lutz et al. | 370/401 |
| 2006/0072550 | A1* | 4/2006 | Davis et al. | 370/352 |
| 2007/0297376 | A1* | 12/2007 | Gass | 370/338 |
| 2009/0262723 | A1* | 10/2009 | Pelletier et al. | 370/352 |
| 2010/0107236 | A1* | 4/2010 | Fujino | 726/12 |
| 2013/0036177 | A1* | 2/2013 | Leeder et al. | 709/206 |

* cited by examiner

*Primary Examiner* — Hong Cho (57) ABSTRACT

An approach for lawful intercept of over-the-top (OTT) communications is described. A request is received to intercept one or more OTT communications. Such interception can be part of a legal mandate of an appropriate law enforcement agency. One or more session and flow identification signatures associated with a packet-based network are determined. Signaling and media traffic associated with the one or more OTT communications are identified, translated and delivered to the law enforcement agency.

16 Claims, 9 Drawing Sheets

METHOD AND SYSTEM FOR INTERCEPTING OVER-THE-TOP COMMUNICATIONS

BACKGROUND INFORMATION

Internet-based services offer users the convenience to communicate flexibly using a variety of media types and media devices. Users not only employ these devices for personal applications, e.g., social networking, personal finance, entertainment, but also for business. As the number of devices connecting to the Internet increase (along with their respective functionalities), these devices produce an ever increasing flow of information that is considered Over-The-Top (OTT) communication. OTT communications typically involve end users communicating with each other in a peer-to-peer mode, mostly utilizing proprietary and private signaling protocols. Lawful intercept of OTT communications poses significant challenges, in large part, because the information flows do not traverse pre-designated common points in the communication paths, and because such intercept require accurate and timely identification. That is, traditionally, lawful intercept can be readily executed because the information flows through a centralized signaling system (e.g., signaling system 7 (SS7)). Thus, service providers tasked with implementing a lawful intercept of such communications have limited options. For example, such options include directing all OTT traffic to a signaling gateway (which is not practical, as this creates a single point of failure as well as a network bottleneck) or conducting a labor-intensive and costly analysis of the network traffic. Moreover, lawful intercept often cannot be performed in a timely manner because the network infrastructure must be manually configured. Consequently, lawful intercept in the context of OTT traffic imposes significant burdens on the operations of service providers and law enforcement agencies (LEA).

Therefore, there is a need for an approach that provides accurate and timely lawful intercept for OTT communications.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method and software for providing lawful intercept of Over-The-Top (OTT) communications are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to Internet Protocol-based (IP-based) networking environments, it is contemplated that these embodiments have applicability to other packet-based service architectures.

According to certain embodiments, as used herein, OTT communications (or services) refer to the delivery or exchange of content or services over a packet-based network without the operator or service provider of the network being involved in the control or distribution of the content and services. By way of example, OTT communications may include services such as Instant Messenger (IM) and Web Real-Time Communication (WebRTC). These services provide text, voice and video communication capabilities. In most cases, such traffic does not traverse a centralized control signaling network. By way of example, in circuit-switched networks (e.g., public switched telephone network (PSTN) and mobile $3^{rd}$ generation partnership project (3GPP) networks), systems such as signaling system 7 (SS7) and Internet protocol multimedia system (IMS) provide a centralized signaling mechanism. Typically, end users engaged in OTT communication install and configure software that operates in a peer-to-peer mode, which performs signaling on an end-to-end basis, rather than network-based signaling.

Figure 1A:
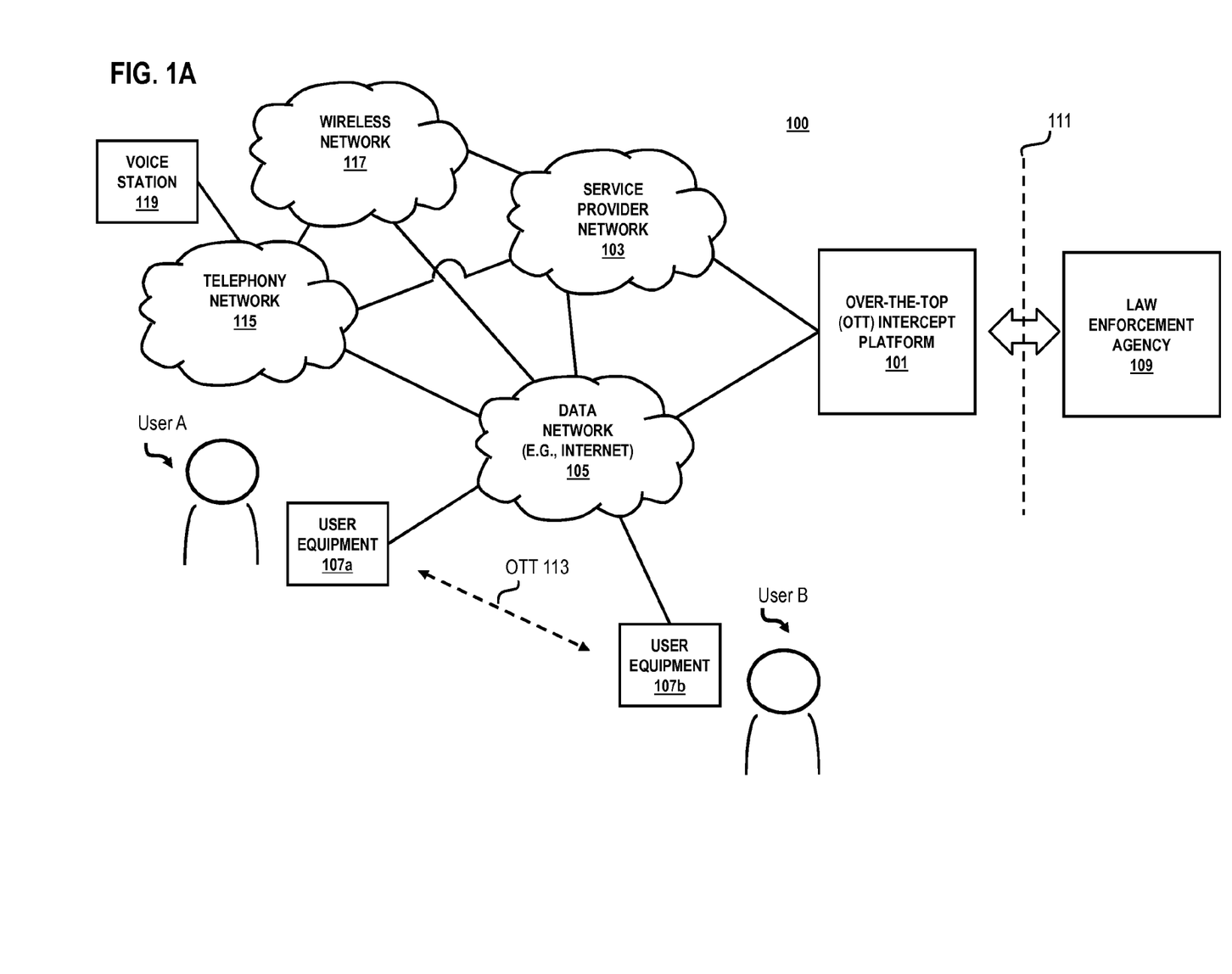
FIG. 1A is a diagram of a system capable of providing lawful intercept of OTT communications, according to one embodiment.

FIG. 1A is a diagram of a system capable of providing lawful intercept of an OTT service, according to one embodiment. For the purpose of illustration, system 100 employs OTT intercept platform 101 that is configured to provide lawful intercept of OTT communications or services. As shown, OTT intercept platform 101 may connect to, or be a part of, service provider network 103 which is owned or operated by the entity responsible for implementing a lawful intercept. By way of example, user A and user B may communicate with each other over data network 105 using OTT services. In one embodiment, data network 105 is an IP-based network to which user equipment (UE) 107a and 107b may connect either directly or indirectly to obtain access to a public data network (e.g., Internet). Although the system 100 of FIG. 1A is described with respect to the Internet, it is contemplated that the intercept mechanism has applicability to other public data networks and data protocols.

In this example, OTT intercept platform 101 may communicate with law enforcement agency (or other agency with appropriate legal authority) 109 over one or more logical or physical law enforcement interfaces 111 across which interception requests are received by OTT intercept platform 101 and over which the results of the interception are delivered to law enforcement agency 109. In one embodiment, communication via OTT intercept platform 101 and law enforcement agency 109 may be governed by standard handover interfaces (HI) and protocols. For example, interface 111 may include HI interfaces 1, 2, and 3 according to various US Communications Assistance for Law Enforcement Act (CALEA) and European Telecommunications Standards Institute (ETSI) standards for lawful interception.

According to one embodiment, user A and user B may engage in an OTT communication 113 via UE 107. In this example, UE 107a and 107b are configured with peer-to-peer networking software (not shown for illustrative convenience) to facilitate their direct communication. For example, users A and B may communicate via a social networking application (e.g., Facebook™) or IM software (e.g., Yahoo™ Messenger, Google™ Chat, etc.). Consequently, the service provider network 103 and data network 105 may allow the signaling and media flows (which may include instant messaging or chat sessions) to occur directly in peer-to-peer mode with no intermediation of the signaling protocols by the network operator.

As mentioned, service providers tasked with implementing a lawful intercept of such communications by a law enforcement agency have to either direct all OTT traffic to a common signaling point or conduct a labor-intensive and extensive analysis of the network traffic. As a result, lawful intercepts cannot be conducted in a timely manner.

To address these challenges, system 100 provides the capability to automatically configure, detect, and capture lawful intercept related information (IRI) (e.g., signaling data) and associated communication content (CC) (e.g., media flows) in response to a lawful intercept request.

By way of example, UE 107 may be any suitable computing device, such as a VoIP phone, skinny client control protocol (SCCP) phone, session initiation protocol (SIP) phone, IP phone, personal computer, softphone, workstation, terminal, server, etc. UE 107 may also be any type of mobile terminal including a mobile handset, mobile station, mobile unit, multimedia computer, multimedia tablet, communicator, netbook, Personal Digital Assistants (PDAs), smartphone, media receiver, etc. It is also contemplated that UE 107 may support any type of interface for providing the presentment or exchange of data. In addition, UE 107 may facilitate various input means for receiving and generating information, including touch screen capability, keyboard and keypad data entry, voice-based input mechanisms, accelerometer (e.g., shaking the UE 107), and the like. Any known and future implementations of UE 107 are applicable. It is noted that, in certain embodiments, the UE 107 may be configured to detect context data using a variety of technologies—i.e., near field communication (NFC), Bluetooth, infrared, etc. Also, connectivity may be provided via a wireless local area network (LAN). By way of example, a group of UE 107 may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each UE 107, i.e., IP addresses that are accessible to devices connected to the service provider network 103 as facilitated via a router, for instance.

In some embodiments, the OTT intercept platform 101, the UE 107, and other elements of the system 100 may be configured to communicate via the service provider network 103. According to certain embodiments, one or more networks, such as the data network 105, the telephony network 115, and/or the wireless network 117, may interact with the service provider network 103. The networks 103, 105, 115, and 117 may be any suitable wireline and/or wireless network, and be managed by one or more service providers. For example, the data network 105 may be any local area network (LAN), metropolitan area network (MAN), wide area network (WAN), the Internet, or any other suitable packet-switched network, such as a commercially owned, proprietary packet-switched network, such as a proprietary cable or fiber-optic network. The telephony network 115 may include a circuit-switched network, such as the PSTN, an integrated services digital network (ISDN), a private branch exchange (PBX), or other like network. For instance, voice station 119 may be any suitable plain old telephone service (POTS) device, facsimile machine, etc. Meanwhile, the wireless network 117 may employ various technologies including, for example, code division multiple access (CDMA), long term evolution (LTE), enhanced data rates for global evolution (EDGE), general packet radio service (GPRS), mobile ad hoc network (MANET), global system for mobile communications (GSM), IMS, universal mobile telecommunications system (UMTS), etc., as well as any other suitable wireless medium, e.g., microwave access (WiMAX), wireless fidelity (WiFi), satellite, and the like.

Although depicted as separate entities, the networks 103, 105, 115, and 117 may be completely or partially contained within one another, or may embody one or more of the aforementioned infrastructures. For instance, the service provider network 103 may embody circuit-switched and/or packet-switched networks that include facilities to provide for transport of circuit-switched and/or packet-based communications. It is further contemplated that the networks 103, 105, 115, and 117 may include components and facilities to provide for signaling and/or bearer communications between the various components or facilities of the system 100. In this manner, the networks 103, 105, 115, and 117 may embody or include portions of a SS7 network, IMS, or other suitable infrastructure to support control and signaling functions.

Figure 1B:
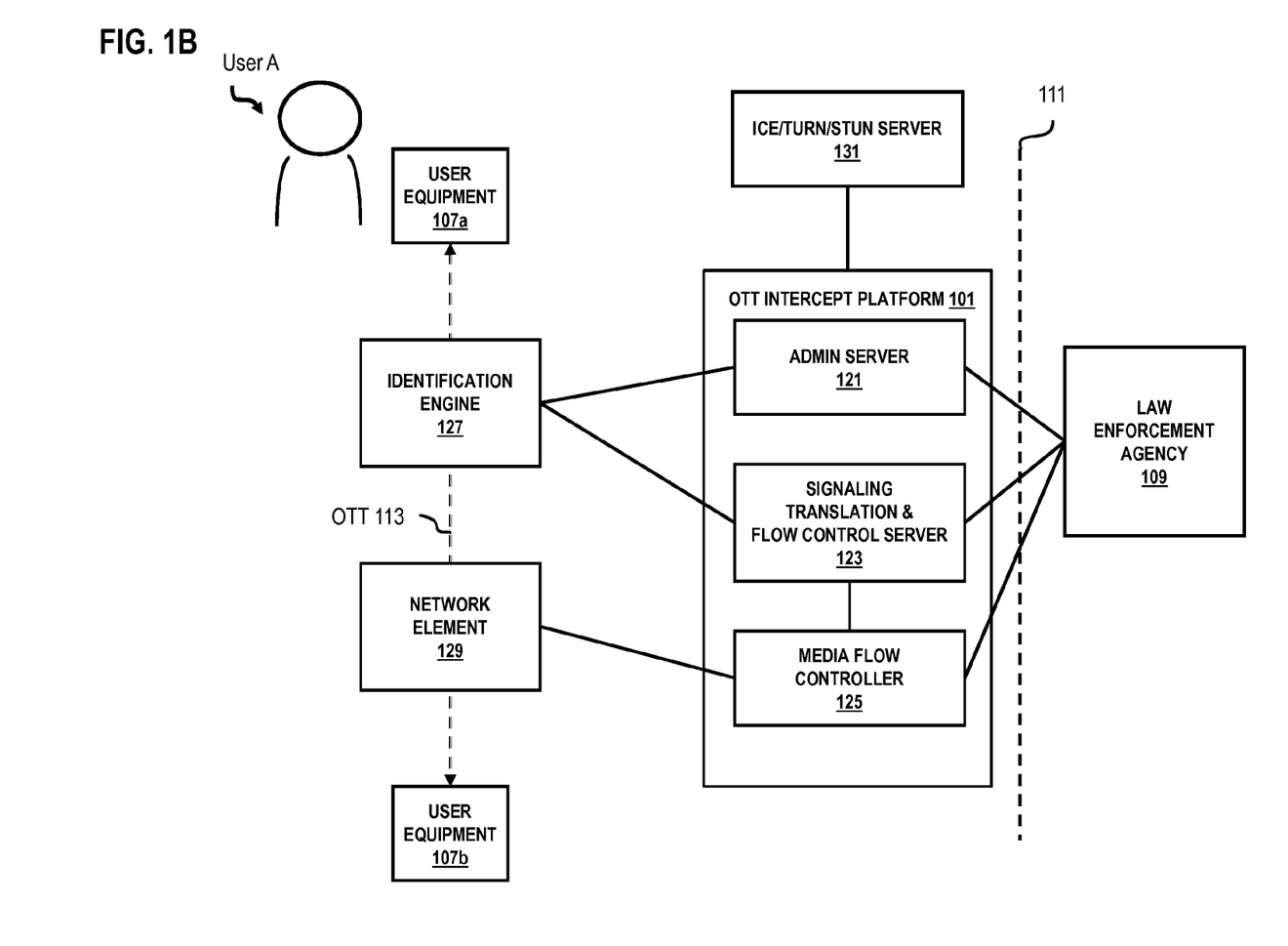
FIG. 1B is a diagram of an OTT intercept platform utilized in the system of FIG. 1A, according to one embodiment.

As shown in FIG. 1B, OTT intercept platform 101 may include an administration server 121, a signaling translation and flow control server 123, and a media flow controller 125. As mentioned, OTT intercept platform 101 may be a part of, or be connected to, data network 105.

Administration server 121 may be connected to one or more identification engines 127 that are in data network 105 at various potential monitoring locations. Identification engines 127 may be implemented to be in the path of any OTT communications (e.g., OTT communication 113) between UE 107a and UE 107b. In one embodiment, administration server 121 may receive lawful intercept requests from law enforcement agency 109 via interface 111 and may then configure identification engine 127 to identify and forward the requested traffic to signaling translation and flow control server 123. Administration server 121 may also connect to an Interactive Connectivity Establishment (ICE), Traversal Using Relay NAT (TURN), or Session Traversal Utilities for NAT (STUN) server 131 in order to obtain a network address of the interception subject (e.g., user A).

Identification engine 127 may be the component of a session/flow identification engine that parses and inspects packets flowing through the network in order to determine a match based on the lawful intercept request. The session/flow identification engine may be configured with one or more session/flow identification signatures to uniquely identify network traffic belonging to a particular OTT communication. In one embodiment, identification engine 127 is a component of a packet-based router or switch. If identification engine 127 identifies signaling information to or from an interception subject (e.g., user A), engine 127 captures and delivers the information to signaling translation and flow control server 123.

Signaling translation and flow control server 123 may forward any signaling information identified by identification engine 127 to law enforcement agency via law enforcement interface 111. In one embodiment, signaling translation and flow control server 123 may also send flow control commands to media flow controller 125 after signaling information is intercepted by identification engine 127. Media flow controller 125 may then configure one or more network elements 129 to identify and forward the media flows associated with the signaling information identified by identification engine 127. In one embodiment, network element 129 may be a software-defined network (SDN)-capable router or switch which may be configured to create a duplicate media flow (forked media flow) from network element 129 to media flow controller 125. As shown, media flow controller 125 may also be connected to law enforcement agency 109 via interface 111. In one embodiment, media flow controller 125 delivers any intercepted media flows to law enforcement agency 109.

Figure 2:
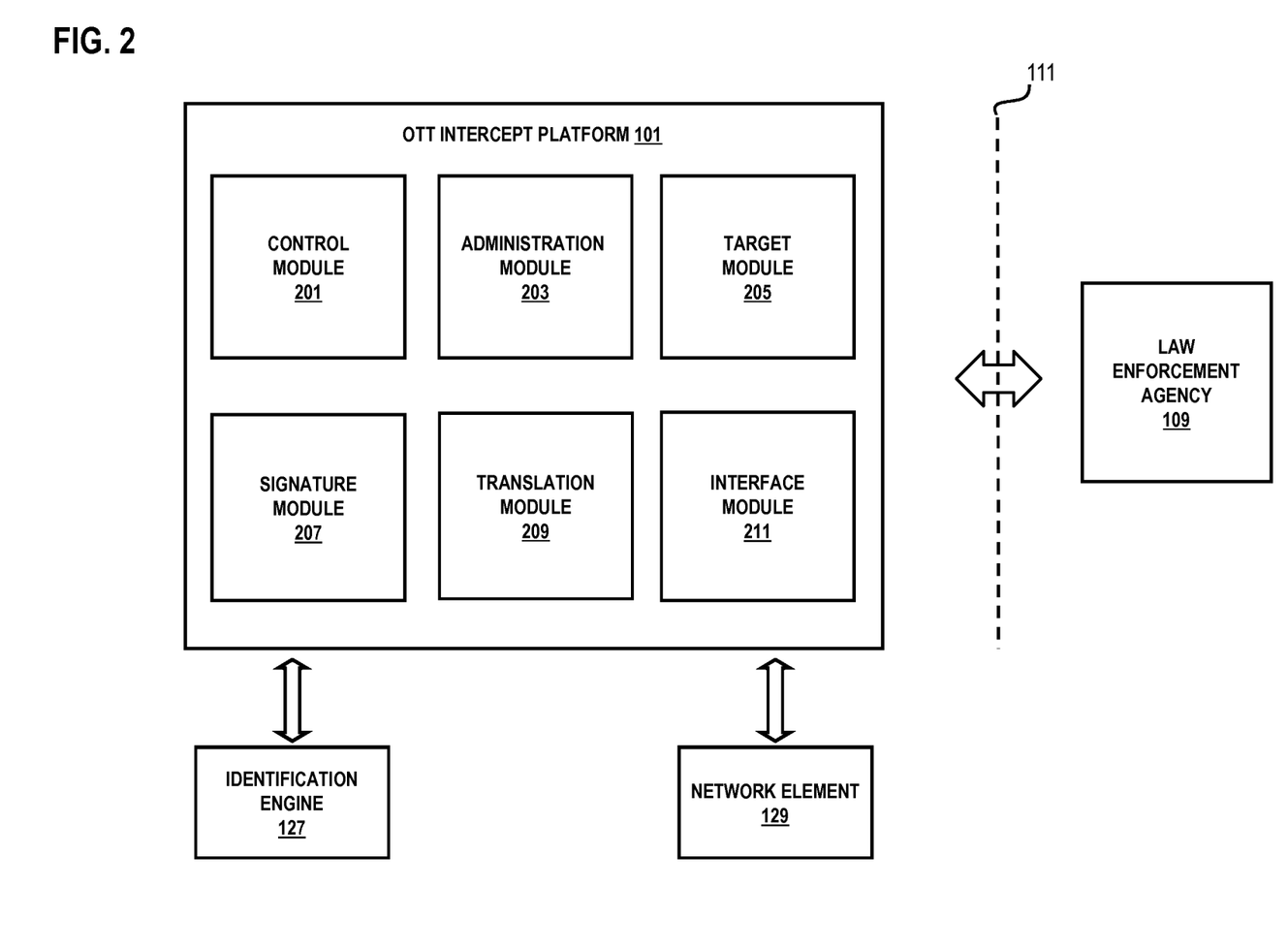
FIG. 2 is a diagram of the components of an OTT intercept platform, according to one embodiment.

FIG. 2 is a diagram of the components of OTT intercept platform 101, according to one embodiment. OTT intercept platform 101 may comprise computing hardware (such as described with respect to FIG. 5), as well as include one or more components configured to execute the processes described herein for providing lawful intercept of OTT communications of the system 100. It is contemplated that the functions of these components may be combined in one or more components or performed by other components of equivalent functionality. In one implementation, OTT intercept platform 101 includes control module 201, administration module 203, target module 205, signature module 207, translation module 209, and interface module 211.

In one embodiment, control module 201 uses administration module 203 to exchange various kinds of administrative information between law enforcement agency 109 and the network operator, access provider, or service provider responsible for providing lawful intercept on data network 105. In one embodiment, administration module 203 may exchange information with law enforcement agency 109 over one or more physical or logical law enforcement interfaces 111. In one embodiment, control module 201 uses administration module 203 to receive requests for lawful interception, including orders for activation, deactivation, and modification of a lawful intercept. The activation information may include information indicating the identity of the interception subject (e.g., user A), a start and end (or duration) of the intercept, the name of the OTT service (e.g., Yahoo™ IM, Facebook™, etc.) that is to be intercepted, as well as any other information needed by OTT intercept platform 101 to accurately perform an authorized lawful intercept.

In one embodiment, control module 201 may use target module 205 to determine the network identifier of one or more subjects of the interception. As used herein, network identifier refers to a network address that is necessary to identify the interception subject on data network 105. In one embodiment, target module 205 may determine the network identification by translating the target identity received from law enforcement agency 109 into an IP address of the user equipment (e.g., UE 107a) connecting the interception subject (e.g., user A) to the network (e.g., data network 105). The IP address of the interception subject may be a translated public IP address obtained from a network address translation (NAT) service. For example, the OTT service may be carried over networks 103, 105, 115, and 115 via an IP tunneling protocol. In one embodiment, target module 205 may query STUN server 131 to obtain the actual network address of the interception subject.

In one embodiment, control module 201 may use signature module 207 to determine and configure one or more identification signatures. As used herein, identification signature refers to a set of technical parameters or features used to identify one or more communications sessions or flows originating from or terminating at the interception subject. In one embodiment, control module 201 may use signature module 207 to determine an identification signature to detect OTT communications based on the lawful intercept request received from law enforcement agency 109. In one embodiment, signature module 207 configures an identification signature on a session/flow identification engine. The session/flow identification engine may be an element or component of data network 105 that may be configured to detect a specific OTT communication session or flow. The identification engine may be configured for inline or offline traffic inspection.

In one embodiment, control module 201 may use translation module 209 to translate (or convert) captured signaling information into a form compatible with law enforcement interface 111 between OTT intercept platform 101 and law enforcement agency 109. In one embodiment, the functionality of translation module 209 may be implemented as part of signaling translation and flow control server 123 which converts the captured signaling information into a form compatible with the IRI format of the law enforcement interface 111.

In one embodiment, control module 201 may use interface module 211 to communicate with law enforcement agency 109 via interface 111. Interface module 211 may be used to implement any standard communication protocols associated with lawful interception, including national and international standards. It is contemplated that there may be instances where OTT intercept platform 101 and law enforcement agency 109 may be in different jurisdictions with different legal and technical standards. In such cases, interface module 211 may ensure that the information exchanged with law enforcement agency 109 meets all requirements for lawful intercept.

Figure 3:
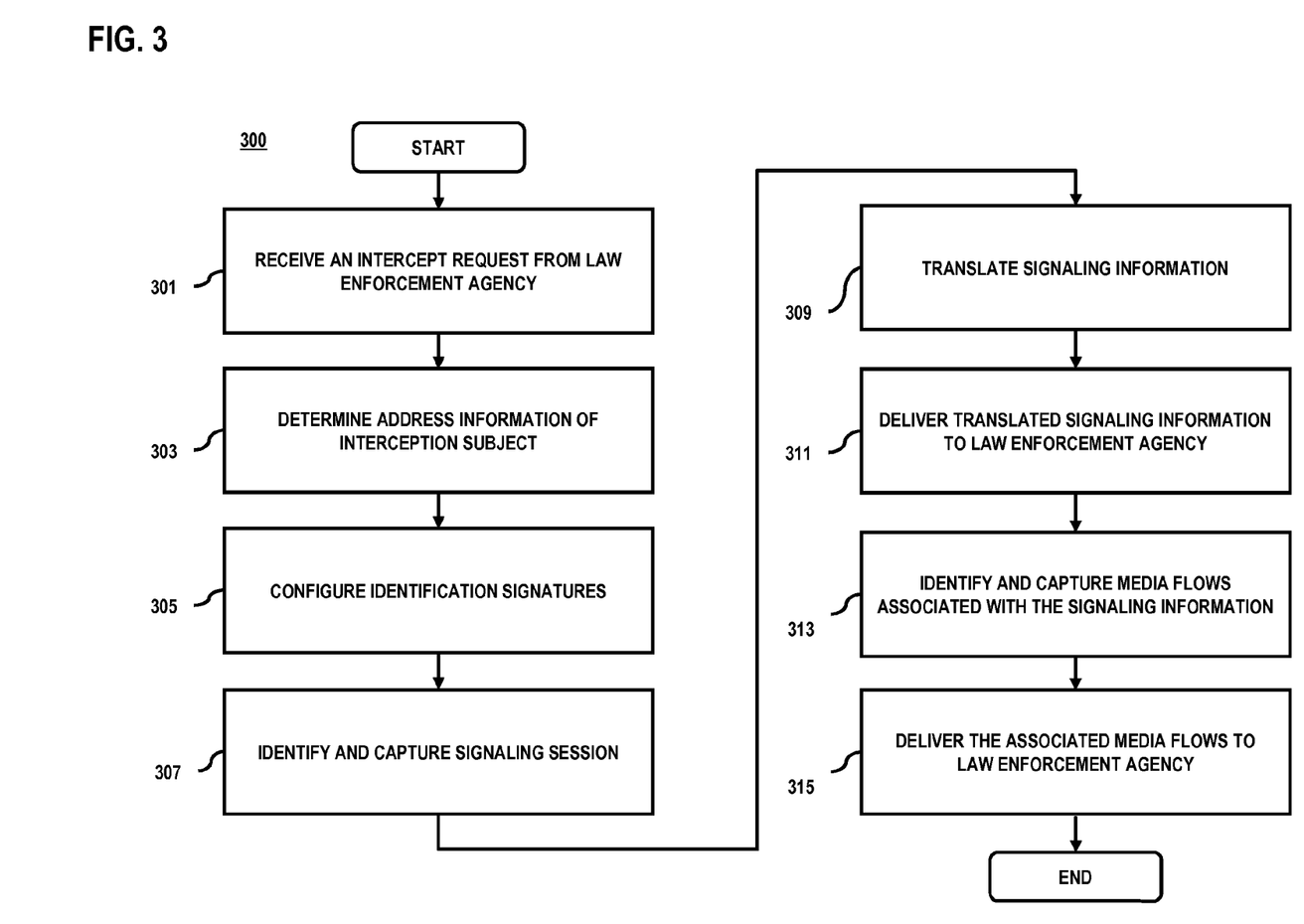
FIG. 3 is a flowchart of a process for providing lawful intercept of OTT communications, according to one embodiment.

FIG. 3 is a flowchart of a process for providing OTT intercept, according to one embodiment. For illustrative purpose, process 300 is described with respect to the system of FIG. 1. It is noted that the steps of process 300 may be performed in any suitable order, as well as combined or separated in any suitable manner.

In step 301, a request for a lawful intercept is received from a law enforcement agency. The request may include the type of information (e.g., voice, video, chat records, etc.) to be intercepted, one or more interception subjects, and the start and stop time (or duration) of the interception. In addition to the identity of the target, the request may also include a target OTT service. In one embodiment, process 300, step 301, may involve receiving a lawful intercept request from law enforcement agency 109 over an HI1 interface.

In step 303, the address of the interception subject is determined. Law enforcement agencies may only provide the name of a subscriber (including any publicly known usernames that the subscriber is known by). In one embodiment, process 300, step 303, may involve determining the network address which the session and media flow identification signatures must utilize to detect OTT communications originating or terminating from the subscriber. For example, the process 300, per step 303, may involve determining the IP address of the subscriber. In cases where the private address is unknown, step 303 may further involve querying ICE, TURN, or STUN servers to obtain the correct IP address for which network monitoring is to be configured.

In step 305, identification signatures are configured based, at least partially, on the information contained in the lawful intercept request. In one embodiment, the process 300, step 305, involves installing identification signatures on an identification engine in the packet-based network traversed by OTT communication packets. As used herein, identification signature refers to a set of parameters or technical features used to identify a communication session in a packet-based network. The parameters may include the target identity and/or target service. The target identity may include the network address of the user equipment (e.g., UE 107a) utilized by the interception subject (e.g., user A). In one embodiment, the target identity may be an IP address. The target service may be any OTT service and may be specified in terms of technical features of the service. For example, an IP-based OTT service may be identified based on the transport layer port numbers it uses. The identification signature may also describe a target service based on identifiable contents of packets exchanged by the OTT service. It is contemplated that identification signatures may include any technical characteristics of the device and/or protocols the interception subject utilizes to access an OTT service via data network 105.

In step 307, the target signaling information is identified and captured. In one embodiment, in step 307, a session/flow identification engine detects the signaling traffic for an OTT service when the interception subject initiates communication via the service. The identification may be based on the configured identification signatures and may include an authorized start and end time (or duration) for the lawful intercept. The OTT communication does not have to originate from the interception subject. For example, the process, per step 307, may involve the session/flow identification engine identifying signaling information when a third party initiates an OTT communication session with the interception subject. Once identified, the target signaling information is captured. In one embodiment, identification engine 127 may forward the target signaling information to signaling translation and flow control server 123 for capture.

In step 309, the captured target signaling information is translated. The translation may convert one or more elements of proprietary signaling information for a packet-based OTT service into corresponding elements of a circuit-based signaling protocol. In one embodiment, signaling translation and flow control server 123 converts, per step 309, the target signaling information into IRI for transmission to law enforcement agency 109 over a CALEA and/or an ETSI standard-compliant law enforcement interface 111. The IRI information may include the specific signaling used to establish and maintain the OTT communication, associated timestamps, and any supplementary information authorized by the lawful intercept. For example, OTT intercept platform 101 may translate proprietary signaling information for a particular OTT service by parsing the information and selectively coding it using various standardized signaling protocols and data encoding techniques (e.g., SS7, IMS, ASN.1 and the BER (Basic Encoding Rules)). It is contemplated that other coding or formatting standards may be used for the translation.

In step 311, the translated signaling information is delivered to the law enforcement agency. In one embodiment, signaling translation and flow control server 123 transmits the IRI obtained to law enforcement agency 109 over law enforcement interface 111. The IRI may be sent at any time after it is made available by the process (per step 309). Various standardized protocols may be used between OTT intercept platform 101 and law enforcement agency 109 for the information delivery.

In step 313, media flows associated with the OTT communication are identified and captured. The media flows may be the information flow during an established, one-way or bi-directional, OTT communication session. In one embodiment, media flow controller 125, per step 313, sends a flow control command to a SDN-capable router or switch in the path of the OTT communication session to create a duplicate media flow (fork) that is forwarded to media flow controller 125 for capture.

In step 315, the captured media flows are delivered to the law enforcement agency that has requested the lawful intercept. In one embodiment, media flow controller 125 transports the captured media flows as an exact literal copy of the information exchanged by the interception subject with one or more OTT communication peers. In another embodiment, media flow controller 125 may translate or modify the captured media flows for transmission to law enforcement agency 109 over a CALEA and/or an ETSI standard-compliant law enforcement interface 111. The captured media flows may be encrypted before delivery to the law enforcement agency. In one embodiment, OTT intercept platform 101 encrypts the captured media flows in order to ensure data security and confidentiality in compliance with the legal standards of the appropriate jurisdiction.

Figure 4A:
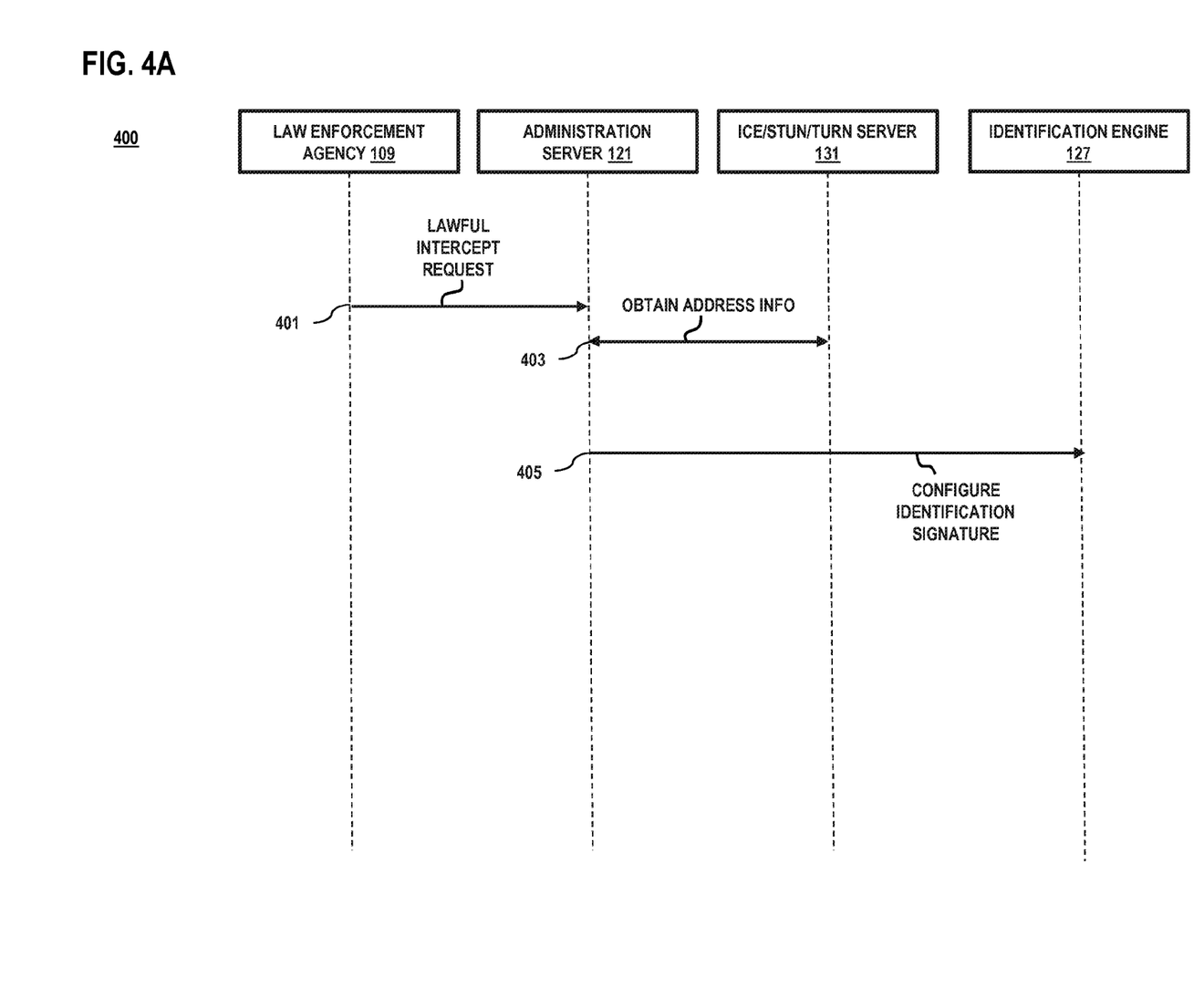
FIGS. 4A-4C are ladder diagrams of a process for providing lawful intercept of OTT communications, according to one embodiment.
Figure 4B:
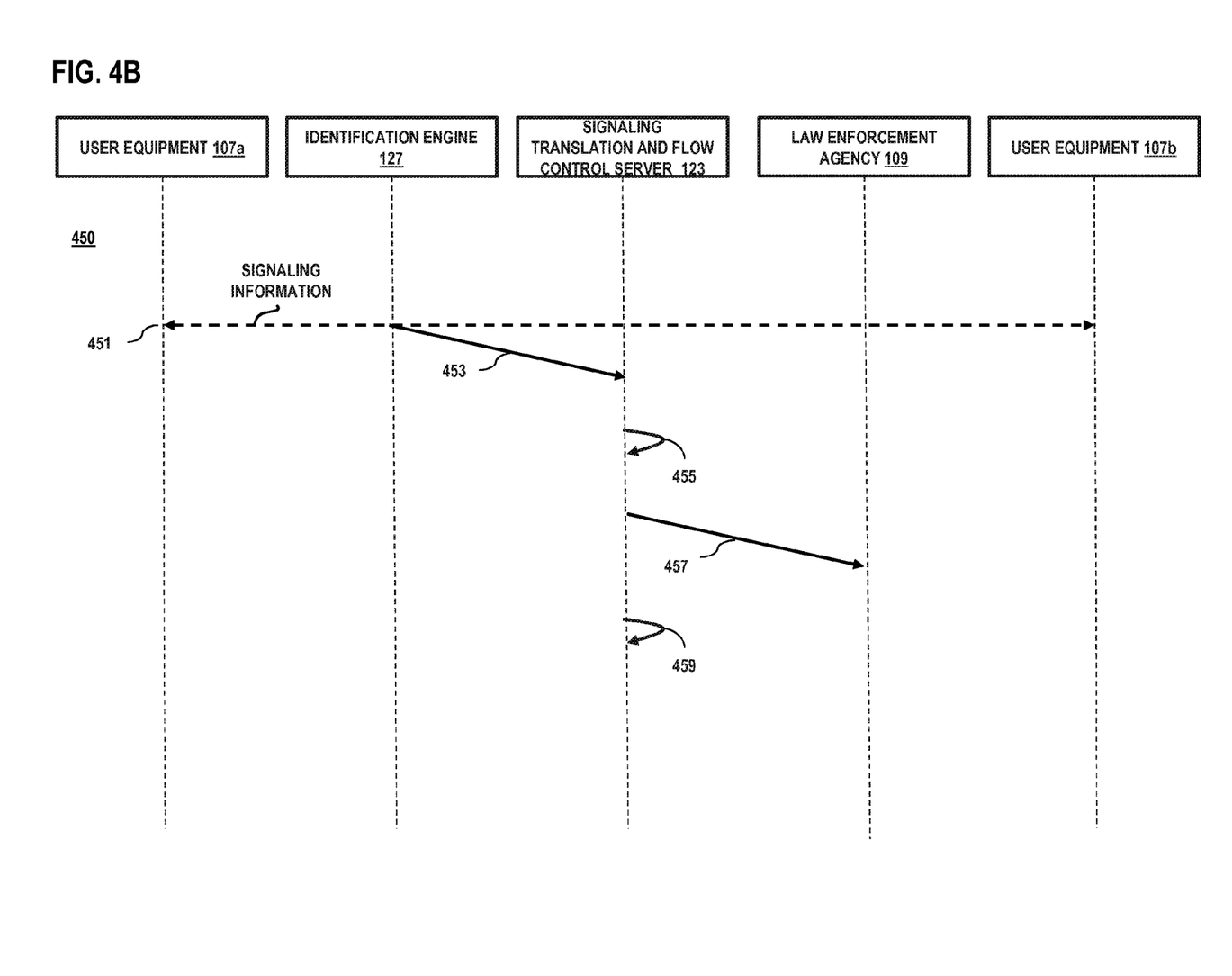
Figure 4C:
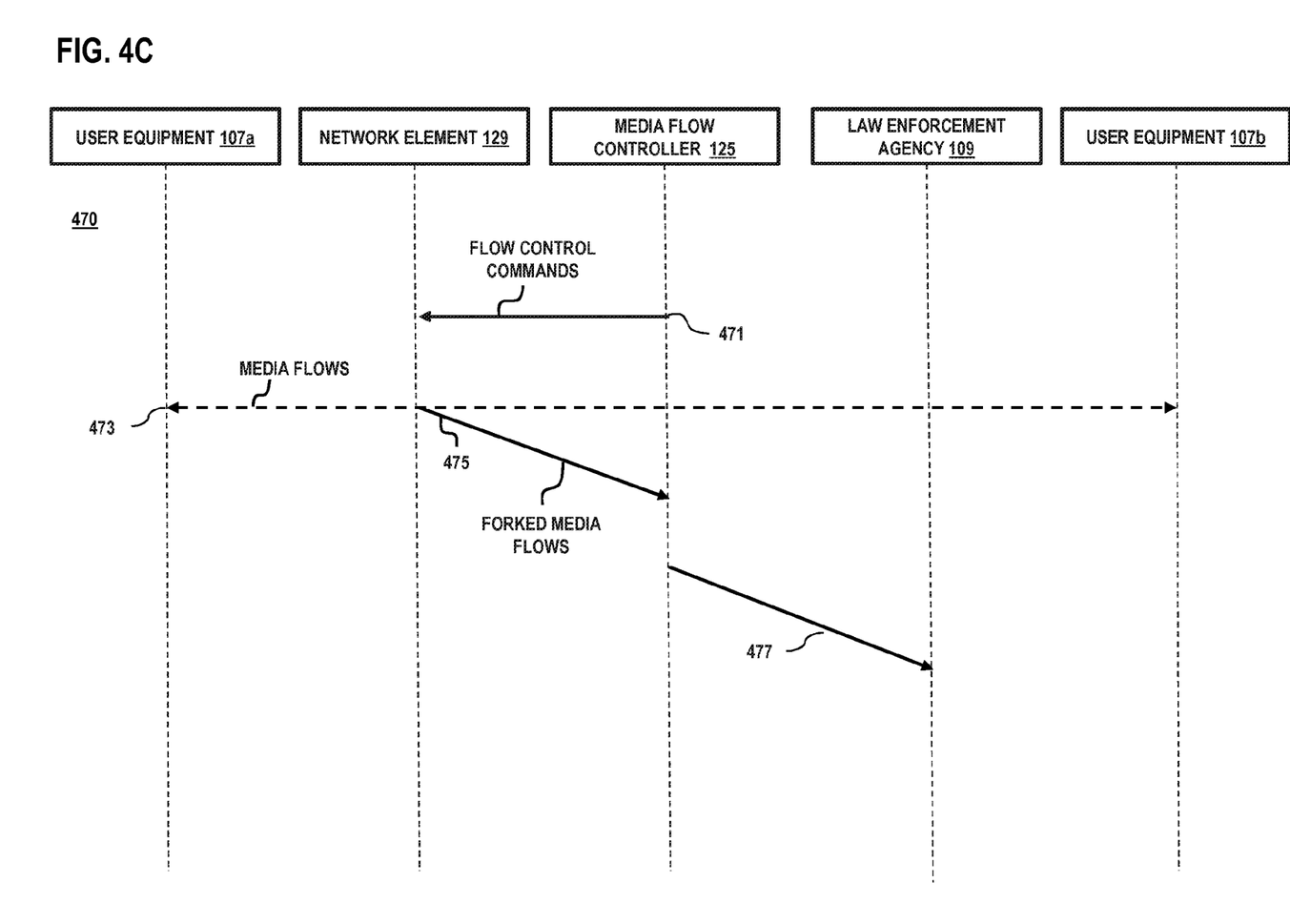

FIGS. 4A-4C are ladder diagrams of a process for accessing a profile, according to one embodiment. For illustrative purpose, process 400 is described with respect to the system of FIGS. 1A and 1B. It is noted that the steps of process 400 may be performed in any suitable order, as well as combined or separated in any suitable manner. In this example, user A is the interception subject and initiates a communication session with user B via a peer-to-peer OTT service (which, for example, employs a private proprietary signaling protocol). Further, user A utilizes an address translation service (e.g., NAT) to access the OTT service via a translated public address.

In step 401, law enforcement agency 109 initiates a lawful intercept request to administration server 121. The request indicates the interception subject (user A) and the times for which lawful intercept is authorized. In step 403, administration server 121 queries STUN server 131 for the IP address of the interception subject. Next, in step 405, administration server 121 determines an identification signature based on the information contained in the lawful intercept request and configures it at identification engine 127 for either inline or offline session capture. The identification signature is specifically configured to identify any OTT communications initiated by user A. Depending on the authorization for the lawful intercept, the identification signature may be configured to begin monitoring the network traffic at a specific starting time. Administration server 121 may alternatively only configure the identification signature at the authorized starting time and delete or disable the configuration when authorization expires. It is further contemplated that administration server 121 may create and store a record for each monitoring event indicating at a desired level of granularity the type of information collected, the identities of all communicating parties, and the duration or timestamps of any phases in the communications.

FIG. 4B is a ladder diagram of a process 450 for the identification, capture, and translation of signaling traffic. Continuing with the example, user A (the interception subject) initiates an OTT session with user B in step 451 at some point after an identification signature has been configured in step 405. In step 453, identification engine 127 identifies and begins forwarding intercepted signaling information. Signaling translation and flow control server 123 receives and translates the signaling information for transfer to law enforcement agency 109. In one embodiment, the process, per step 455, converts the relevant pieces of captured signaling information into a form compatible with law enforcement interface 111. Next, the process, per step 455, may also involve creating an event record with respect to the initiation of law intercept and including within the event record information regarding the identity of the target, the timestamp when monitoring began, and other session identifying information required to uniquely identify the intercept event.

In step 457, signaling translation and flow control server 123 delivers the captured signaling information to law enforcement agency 109. In step 459, signaling translation and flow control server 123 determines one or more media flow identifying commands based on the captured signaling information. In one embodiment, signaling translation and flow control server 123 determines the flow control commands for configuring a SDN media flow controller to identify and fork the media flows for delivery to media flow controller 125.

FIG. 4C is a ladder diagram of a process 470 for the identification and capture of media flows. As mentioned in connection with FIG. 4B, signaling translation and flow control server 123 determines one or more media flow identifying commands in step 459. Continuing with the example, in step 471, media flow controller 125 sends the media flow identifying commands to a network element 129 in the path of the media flows. In one embodiment, network element 129 is an SDN-capable switch or router.

As shown, media flow 473 associated with the target session is continuing while network element 129 is configured. In step 475, as soon as network element 129 has been configured, the process begins forwarding duplicate media flows to media flow controller 125. In one embodiment, the media flows are generated by forking the traffic between user A and user B at network element 129. Next, in step 477, media flow controller 125 forwards the captured media flows to law enforcement agency 109. The identification signatures and flow control commands may remain in place at identification engine 127 and network element 129, respectively, for as long as authorized by the lawful intercept request. Alternatively, the intercept configuration may expire at the end of the OTT session. It is contemplated that one or more elements of OTT intercept platform 101 may utilize various safeguards to ensure that the lawful intercept is at all times fully authorized and that any records generated by the monitoring are maintained with appropriate degree of confidentiality. Continuing with the example, the lawful intercept request only indicated user A as the interception subject; user B was unnamed. In one embodiment, OTT intercept platform 101 may employ data security and confidentiality measures to remove any personal identifying information of user B from the records generated in response to the interception.

From the above discussion, numerous advantages are provided by the various embodiments. Service providers can provide effective and timely lawful intercept of OTT communications to law enforcement agencies without no or minimal manual configuration of the network infrastructure. Service providers and/or law enforcement agencies can avoid a time consuming and costly analysis of intercepted data by allowing lawful intercept of OTT text, video, voice communications with the existing network infrastructure of the service provider as well as the law enforcement agency.

The processes described herein for providing lawful intercept of OTT communications may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
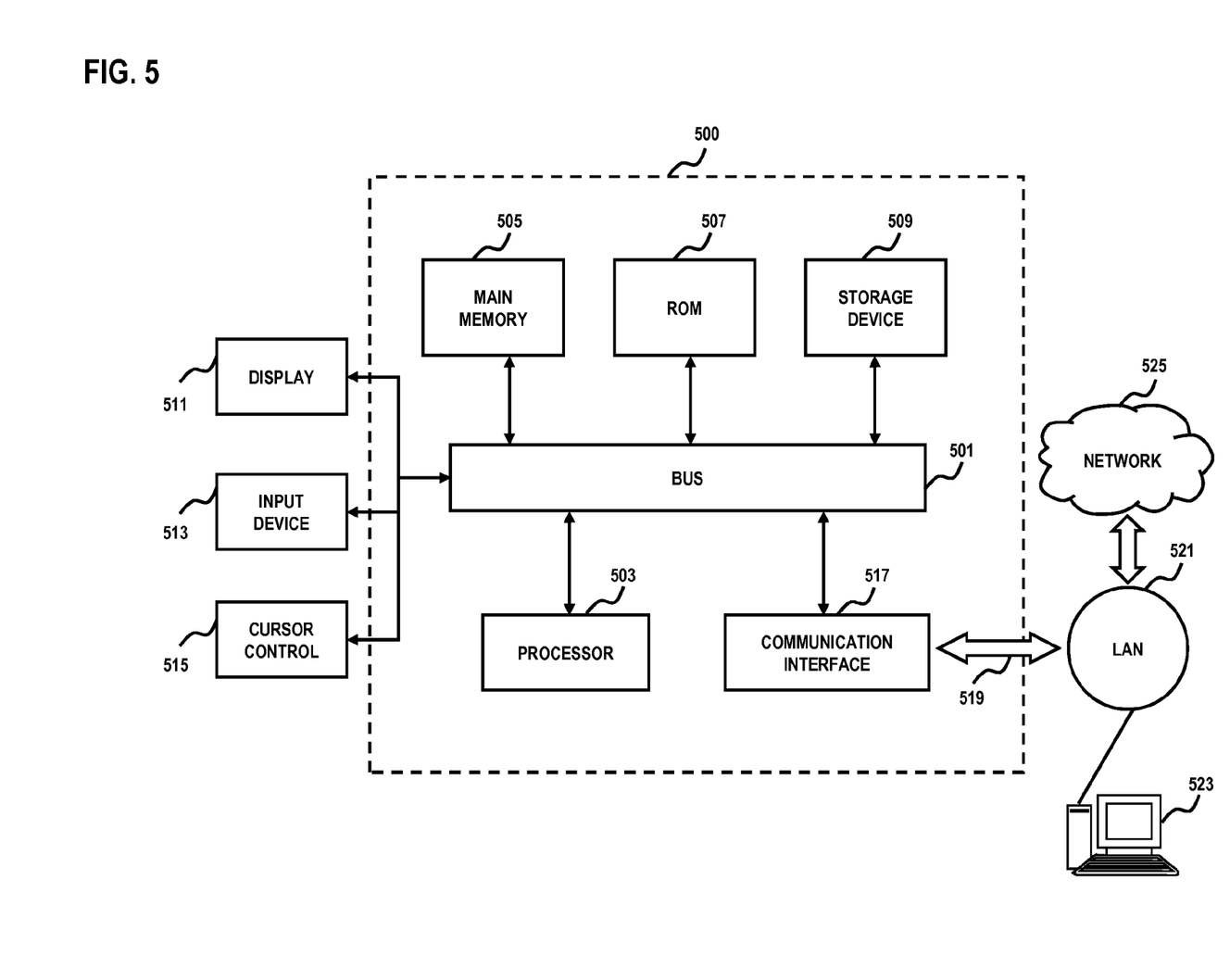
FIG. 5 is a diagram of a computer system that can be used to implement various exemplary embodiments.

FIG. 5 is a diagram of a computer system that can be used to implement various exemplary embodiments. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk, flash storage, or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. Additional output mechanisms may include haptics, audio, video, etc. An input device 513, such as a keyboard including alphanumeric and other keys, is coupled to the bus 501 for communicating information and command selections to the processor 503. Another type of user input device is a cursor control 515, such as a mouse, a trackball, touch screen, or cursor direction keys, for communicating direction information and command selections to the processor 503 and for adjusting cursor movement on the display 511.

According to an embodiment, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

Figure 6:
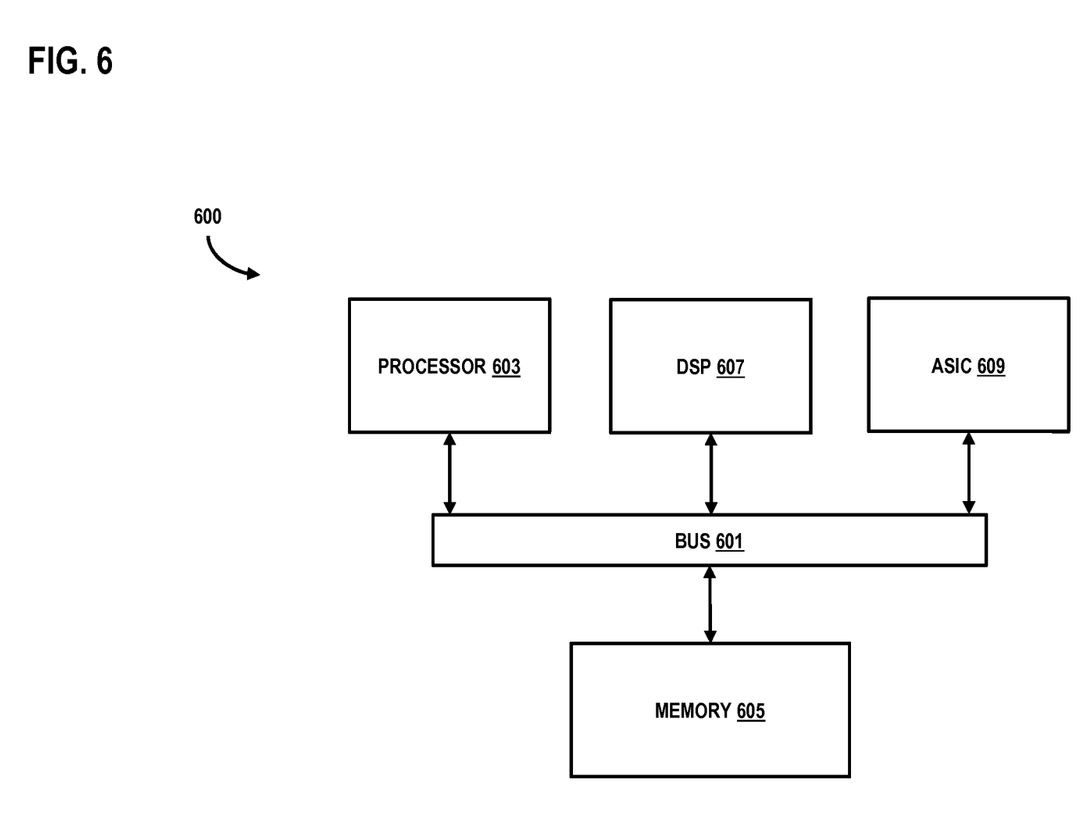
FIG. 6 is a diagram of a chip set that can be used to implement an embodiment of the invention.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 6, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 6 illustrates a chip set or chip 600 upon which an embodiment of the invention may be implemented. Chip set 600 is programmed to enable cloud-based profile access as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of enabling the management of device profiles.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to enable cloud-based profile access. The memory 605 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
receiving, by an apparatus of a network operator, a request to intercept one or more over-the-top (OTT) communications of an interception subject, the one or more OTT communications operating in a peer-to-peer communication mode without intermediation of one or more signaling protocols by the network operator;
determining, by the apparatus, one or more identification signatures associated with the one or more OTT communications over a packet-based network;
identifying signaling traffic associated with the one or more OTT communications based on the one or more identification signatures using one or more identification engines implemented in a path of OTT communication to and from the interception subject, wherein the one or more identification signatures are based, at least in part, on an Internet Protocol (IP) address of the interception subject and at least one of a communication service and a signaling protocol used in the communication service; and
configuring the one or more identification engines to identify the one or more OTT communications by detecting that the interception subject starts the one or more OTT communications using the at least one of the communication service and the signaling protocol.

2. A method of claim 1, further comprising:
obtaining the IP address of the interception subject from a network address translation service; and
determining the one or more identification signatures based on address information and/or other parameters or features of the packet-based network,
wherein the one or more service providers provide one or more instant messaging services, one or more social network services, or a combination thereof, in the peer-to-peer communication mode.

3. A method of claim 1, further comprising:
capturing the signaling traffic; and
translating signaling information contained within the signaling traffic to corresponding information for a circuit-based network,
wherein the one or more OTT communications are carried via an internet protocol tunneling protocol.

4. A method of claim 1, further comprising:
configuring a media flow controller to capture one or more media flows associated with the signaling traffic; and
translating media flow information contained within the one or more media flows to corresponding information for a circuit-based network.

5. A method of claim 1, wherein the one or more identification signatures include one or more transport layer port numbers used by the communication service.

6. An apparatus comprising:
at least one processor; and
at least one memory including computer program code for one or more programs,
the at least one memory and the computer program code configured to, with the at least one processor, cause the apparatus of a network operator to perform at least the following,
receive a request to lawfully intercept one or more over-the-top (OTT) communications of an interception subject, the one or more OTT communications operating in a peer-to-peer communication mode without intermediation of one or more signaling protocols by the network operator,
determine one or more identification signatures associated with the one or more OTT communications over a packet-based network,
identify signaling traffic associated with the one or more OTT communications based on the one or more identification signatures, wherein the one or more identification signatures are based, at least in part, on an Internet Protocol (IP) address of an interception subject; and
configure a plurality of identification engines to identify the one or more OTT communications based on the one or more identification signatures.

7. An apparatus of claim 6, wherein the apparatus is further caused to:
determine the one or more identification signatures based on address information and/or other parameters or features of the packet-based network.

8. An apparatus of claim 6, wherein the apparatus is further caused to:
capture the signaling traffic; and
translate signaling information contained within the signaling traffic to corresponding information for a circuit-based network.

9. An apparatus of claim 6, wherein the apparatus is further caused to:
configure a media flow controller to capture one or more media flows associated with the signaling traffic; and
translate media flow information contained within the one or more media flows to corresponding information for a circuit-based network.

10. A system comprising:
an over-the-top (OTT) intercept platform configured to receive a request to intercept one or more OTT communications of an interception subject, the one or more OTT communications operating in a peer-to-peer communication mode without intermediation of one or more signaling protocols by an network operator, and to determine one or more identification signatures associated with the one or more OTT communications over a packet-based network; and
one or more identification engines configured to identify signaling traffic associated with the one or more OTT communications based on the one or more identification signatures, the one or more identification engines disposed in a communication path of the one or more OTT communications, wherein the one or more identification signatures are based, at least in part, on an Internet Protocol (IP) address of the interception subject and at least one of a communication service and a signaling protocol used in the communication service.

11. A system of claim 10, wherein the one or more identification signatures are based, at least in part, on an Internet Protocol (IP) address.

12. A system of claim 10, wherein the one or more identification engines are further configured to identify the one or more OTT communications based on the one or more identification signatures.

13. A system of claim 10, wherein the OTT intercept platform determines one or more identification signatures based on address information and/or other parameters or features of the packet-based network.

14. A system of claim 10, wherein the one or more identification engines are further configured to capture the signaling traffic, and the OTT intercept platform is further configured to translate signaling information contained within the signaling traffic to corresponding information for a circuit-based network.

15. A system of claim 10, further comprising:
a media flow controller configured to capture one or more media flows associated with the signaling traffic, and translate media flow information contained within the one or more media flows to corresponding information for a circuit-based network.

16. A system of claim 10, wherein the request is generated by a law enforcement agency.

* * * * *